United States Patent [19]
Shiau et al.

[11] Patent Number: 5,710,836
[45] Date of Patent: Jan. 20, 1998

[54] SYSTEM AND APPARATUS FOR TONAL REPRODUCTION ADJUSTMENT IN AN ERROR DIFFUSION PROCESS

[75] Inventors: Jeng-Nan Shiau, Webster; Francis K. Tse, Rochester, both of N.Y.

[73] Assignee: Xerox Corporation, Stamford, Conn.

[21] Appl. No.: 347,754

[22] Filed: Dec. 1, 1994

[51] Int. Cl.$^6$ .............................. G06T 5/00; H04N 1/405
[52] U.S. Cl. ........................ 382/237; 382/252; 358/456
[58] Field of Search ..................................... 382/270, 237, 382/252; 358/456, 457, 458, 460, 466, 298, 534; 395/109

[56] References Cited

U.S. PATENT DOCUMENTS

| | | | |
|---|---|---|---|
| 4,924,322 | 5/1990 | Kurosawa et al. | 358/457 |
| 5,087,981 | 2/1992 | Ng et al. | 358/459 |
| 5,463,478 | 10/1995 | Makita et al. | 358/456 |

Primary Examiner—Scott A. Rogers
Attorney, Agent, or Firm—Michael J. Nickerson

[57] ABSTRACT

An error diffusion process adds an error value to an input grey image value to produce a modified input grey image value before comparing the modified input grey image value with a predetermined threshold value. A rendering value and error is generated based on the comparison. An error equal to the modified input grey value is generated when the modified input grey value is less than the predetermined threshold value, and an error equal to the modified input grey value minus an effective spot area value is generated when the modified input grey value is equal to or greater than the predetermined threshold value. The effective spot area value is retrieved from a look-up table having a plurality of effective spot area values based on the input grey image value. The effective spot area values is created from a process of scanning a set of grey test patches corresponding to a set of known grey input values and generating image data therefrom, printing a set of grey patches based on the generated image data, measuring a reflectance of each grey test patch to generate a plurality of output grey values, one output grey value for each test patch and corresponding known grey input value, generating a tonal reproduction curve from the set of known grey input values and corresponding output grey values, calculating a plurality of effective spot area values, each effective spot area value being a result of dividing one output grey value by the corresponding known grey input value, and storing the plurality of effective spot area values as a function of the output grey value. The generated error is fractionalized and diffused to neighboring pixels.

16 Claims, 2 Drawing Sheets

SYSTEM AND APPARATUS FOR TONAL REPRODUCTION ADJUSTMENT IN AN ERROR DIFFUSION PROCESS

FIELD OF THE PRESENT INVENTION

The present invention is directed to an error diffusion process which allows for adjustment of the tonal reproduction curve (TRC) in a printer or printing system. More specifically, the present invention is directed to an error diffusion process for adjusting the tonal reproduction curve so as to compensate for spot overlap produced by a printing device.

BACKGROUND OF THE PRESENT INVENTION

A well known method of rendering grey images on a binary output device is error diffusion. Error diffusion is most commonly used in displaying continuous tone images on a bi-level display. However, error diffusion has been also utilized in digital copiers and binary printing devices to render grey and continuous tone images.

In a conventional error diffusion process, a modified video signal is fed to a comparator which compares the modified video signal to a threshold value. The comparator outputs a logic one when the modified video signal has a value greater than or equal to the threshold value and outputs a logic zero when the modified video signal has a value less than the threshold value. Depending on whether the rendering device connected to this error diffusion process is a write white system or a write black system, the logic value of the output from the comparator will cause the rendering device to produce a pixel or not.

In addition to producing the binary value for the rendering device, the comparator produces an error value. The error value is equal to the modified video signal value when the modified video signal has a value less than the threshold value, or the error value is equal to the modified video signal value minus the maximum video value when the modified video signal has a value greater than or equal to the threshold value. The error is diffused to downstream pixels, the next pixel in the same scanline and pixels in the next scanline. This error is then accumulated for each pixel such that when a particular pixel is to be processed by the error diffusion process, the accumulated error value for the particular pixel is added to the incoming video signal corresponding to the particular pixel to produce the modified video signal being fed into comparator.

Examples of error diffusion processes are disclosed co-pending U.S. patent applications, Ser. No. 08/285,265; 08/285,572; and 08/285,324. The entire contents of these co-pending U.S. patent applications are hereby incorporated by reference.

One problem with utilizing error diffusion in a printing environment is that the tonal reproduction curve (TRC) tends to be nonlinear. This nonlinear characteristic of the TRC presents various problems in attempting to render a grey image or continuous tone image on a binary printing device.

For example, if a grey wedge is to be reproduced on a digital copier utilizing a conventional error diffusion process, wherein the grey wedge image is printed at 300 spots per inch, the reproduced grey wedge tends to show a rapid increase in density when compared to the original grey wedge. Moreover, if a digital copier utilizing a standard conventional error diffusion method scans in a continuous tone image and reproduces a continuous tone image at 300 spots per inch, the reproduced continuous tone image tends to be too dark in comparison with the original continuous tone image. Thus, utilizing conventional error diffusion to render grey or continuous tone images on a binary device cannot render a reproduced copy having high image quality.

To address this problem with the standard error diffusion process, it has been proposed to process the image data through a compensating grey level confirmation before printing the image data with error diffusion. An example of such a proposal is disclosed in U.S. Pat. No. 5,087,981. The entire contents of U.S. Pat. No. 5,087,981 are hereby incorporated by reference.

U.S. Pat. No. 5,087,981 discloses the utilization of a compensation grey level transformation wherein the area coverage of a new print spot minus that of the area coverage that corresponds to the overlap of the previously printed spots is calculated. This net spot coverage is then normalized to the pixel spacing and is square to determine the effective area A. It is noted that in this transformation, A is greater than 1. Once the effective area of the new print spot is calculated, the effective area is utilized in computing the total error for diffusing to downstream pixels. More specifically, the total error in printing a pixel with a grey level G is calculated as G–A.

If a grey wedge is scanned in by a digital copier and the grey edge image is reproduced at 300 spots per inch utilizing the compensating error diffusion process of U.S. Pat. No. 5,087,981, the reproduced grey wedge demonstrates a gradual increase in density when compared to the original grey wedge. However, the utilization of this compensating error diffusion process appears to produce clumps and streaks of dark pixels in the midtone to shadow areas of the reproduced grey edge. Therefore, it is desirable to provide a compensated error diffusion method wherein the density of a reproduced grey wedge gradually increases without the artifacts of clumps and streaks of dark pixels in the midtone to shadow areas.

SUMMARY OF THE PRESENT INVENTION

One aspect of the present invention is a system for processing an input grey image value corresponding to a pixel. The system includes modifying means for adding an error value to the input grey image value to produce a modified input grey image value and comparing means for comparing the modified input grey image value with a predetermined threshold value and for outputting a rendering value based on the comparison. Error means, operatively connected to the comparing means, generates an error equal to the modified input grey value when the modified input grey value is less than the predetermined threshold value and an error equal to the modified input grey value minus an effective spot area value when the modified input grey value is equal to or greater than the predetermined threshold value. Diffusing means fractionalizes the error into fractional error values and diffuses the fractional error values to adjacent pixels. The system also includes buffer means, operatively connected to the diffusing means and the modifying means, for accumulating the diffused fractional error values for individual pixels and generating the error value therefrom.

Another aspect of the present invention is a digital copier. The digital copier includes scanning means for scanning a document and generating input grey image values corresponding to a plurality of pixels and modifying means for adding an error value to an input grey image value corresponding to a first pixel to produce a modified input grey image value. Comparing means compares the modified input grey image value with a predetermined threshold value and outputs a rendering value based on the comparison. Error means, operatively connected to the comparing means, generates an error equal to the modified input grey value when the modified input grey value is less than the predetermined threshold value and an error equal to the modified input grey value minus an effective slot area value when the modified input grey value is equal to or greater than the predetermined threshold value. Diffusing means fractionalizes the error into fractional error values and diffuses the fractional error values to adjacent pixels. Buffer means, operatively connected to the diffusing means and the modifying means, accumulates the diffused fractional error values for individual pixels and generating the error value therefrom. The digital copier also includes print means, operatively connected to the comparing means, for reproducing an image on a recording medium based on the output from the comparing means.

A third aspect of the present invention is a method of processing an input grey image value corresponding to a pixel. The method adds an error value to the input grey image value to produce a modified input grey image value and compares the modified input grey image value with a predetermined threshold value and outputting a rendering value based on the comparison. An error equal to the modified input grey value is generated when the modified input grey value is less than the predetermined threshold value, and an error equal to the modified input grey value minus an effective spot area value is generated when the modified input grey value is equal to or greater than the predetermined threshold value. The error is fractionalized into fractional error values, and the fractional error values are diffused to adjacent pixels. The method also accumulates the diffused fractional error values for individual pixels and generates the error value therefrom.

A fourth aspect of the present invention is a method of generating an effective spot area value to be used in an error diffusion process. The method scans a set of grey test patches corresponding to a set of known grey input values and generates image data therefrom. A set of grey patches are printed based on the generated image data, and the reflectance of each grey test patch is measured to generate a plurality of output grey values, one output grey value for each test patch and corresponding known grey input value. A tonal reproduction curve is generated from the set of known grey input values and corresponding output grey values, and a plurality of effective spot area values are calculated, each effective spot area value being a result of dividing one output grey value by the corresponding known grey input value.

A fifth aspect of the present invention is a system for processing an input grey image value corresponding to a pixel. The system includes modifying means for adding an error value to the input grey image value to produce a modified input grey image value and comparing means for comparing the modified input grey image value with a predetermined threshold value and for outputting a rendering value based on the comparison. Effective spot area value means outputs one of a plurality of effective spot area values according to the input grey image value. The effective spot area values are created from a process of scanning a set of grey test patches corresponding to a set of known grey input values and generating image data therefrom, printing a set of grey patches based on the generated image data, measuring a reflectance of each grey test patch to generate a plurality of output grey values, one output grey value for each test patch and corresponding known grey input value, generating a tonal reproduction curve from the set of known grey input values and corresponding output grey values, calculating a plurality of effective spot area values, each effective spot area value being a result of dividing one output grey value by the corresponding known grey input value, and storing the plurality of effective spot area values as a function of the output grey value. Error means, operatively connected to the comparing means and the effective spot area value means, generates an error equal to the modified input grey value when the modified input grey value is less than the predetermined threshold value and generates an error equal to the modified input grey value minus the effective spot area value when the modified input grey value is equal to or greater than the predetermined threshold value. Diffusing means fractionalizes the error into fractional error values and diffuses the fractional error values to adjacent pixels. The system also includes buffer means, operatively connected to the diffusing means and the modifying means, for accumulating the diffused fractional error values for individual pixels and generating the error value therefrom.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
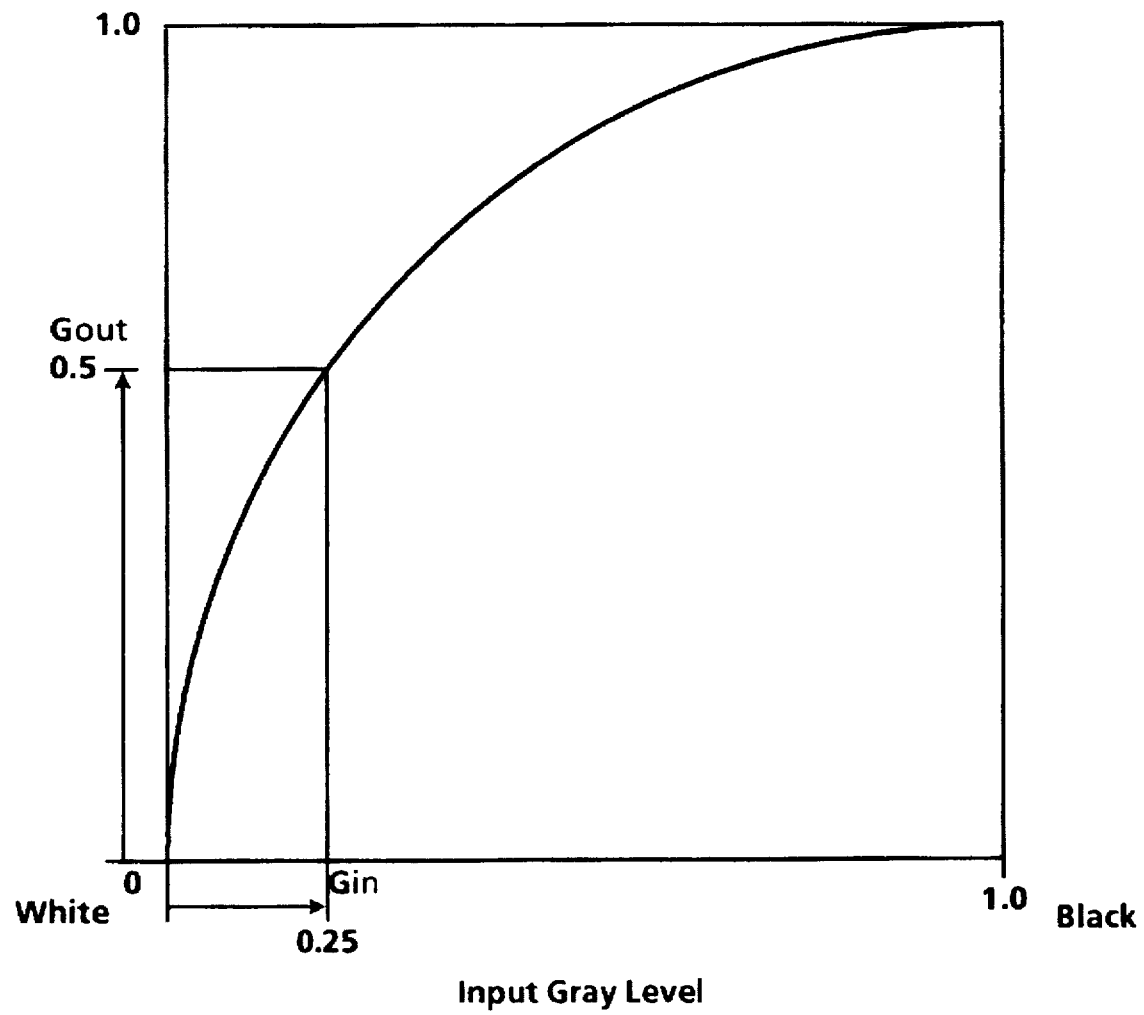
FIG. 1 shows a tonal reproduction curve illustrating the general shape of the input and output grey level relationship for a convention binary printing device utilizing a standard error diffusion process.

The following will be a detailed description of the drawings illustrating the present invention. In this description, as well as in the drawings, like references represent like devices, circuits, or circuits performing equivalent functions.

FIG. 1 shows a tonal reproduction curve (TRC) which is produced from printing test patches from ranging from white to black with a standard error diffusion process and then measuring the reflectance of each test patch. In other words, FIG. 1 illustrates the relationship between a predetermined input grey level $G_{in}$, the grey level value being fed to the printer for rendering, and the output grey level $G_{out}$, the actual grey level value rendered by a printing device. In this situation, the input grey level $G_{in}$ is known and the output grey level $G_{out}$ is determined by measuring the reflectance of each test patch. In such a situation, as illustrated in FIG. 1, an input grey level $G_{in}$ of approximately 0.25 will cause a printer utilizing a standard error diffusion process to render an output grey level $G_{out}$ approximately 0.5. Thus, as discussed above, the standard error diffusion process fails to give a faithful linear reproduction of grey images wherein an input grey level $G_{in}$ of 0.25 will cause a printer to render an output grey level $G_{out}$ of 0.5.

It is desirable to linearize the TRC so that the reproduced copies are a true rendering of the original. If the standard error diffusion process produced a linearized tonal reproduction curve, the curve in FIG. 1 would be a straight line between the point (0,0) and the point (1,1). In other words, the input grey level $G_{in}$ of 0.5 would produce an output grey level $G_{out}$ of 0.5. One method of linearizing this tonal reproduction curve is disclosed in U.S. Pat. No. 5,087,981 as discussed above. However, the reproduced copies, especially a reproduced grey wedge, tends to have clumps and streaks of dark pixels in the midtone to shadow areas of the image. An alternative to this linearization process will be discussed in more detail below with respect to FIG. 2.

Figure 2:
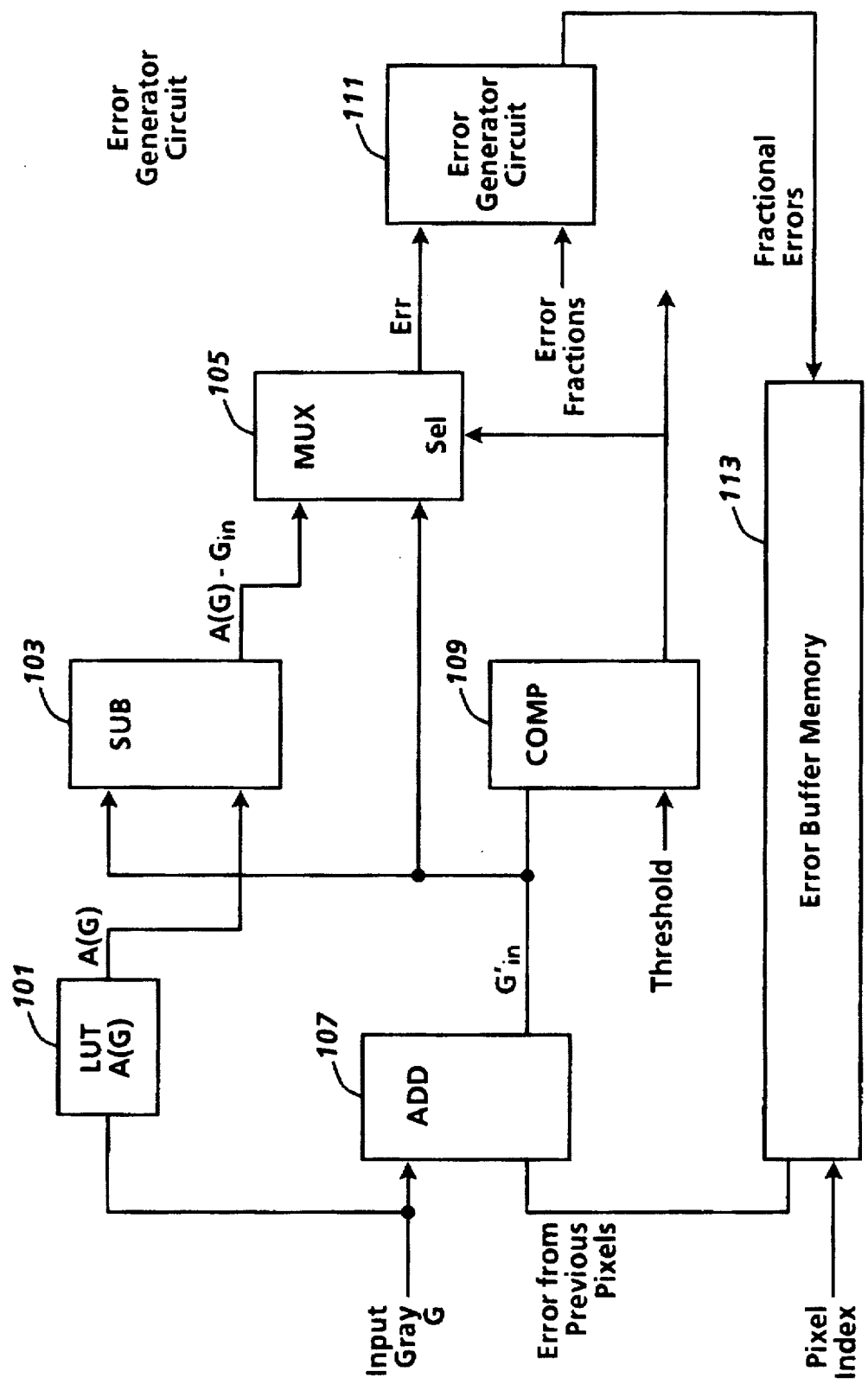
FIG. 2 shows a block diagram illustrating a circuit for implementing an error diffusion according to the concepts of the present invention.

FIG. 2 illustrates a block diagram wherein the TRC from the error diffusion process is linearized without the production of the previously mentioned artifacts (clumps and streaks of dark pixels in the midtone to shadow areas of the image). More specifically, rather than performing a deterministic computation of the spot coverage of each new black pixel as described in the U.S. Pat. No. 5,087,981, the present invention empirically deduces the effective area. This empirically deduced effective area is then utilized to compensate the error diffusion process so that the TRC is substantially linearized.

The process for empirically Deducing the effective area will be explained in detail by utilizing FIG. 1. Initially, test patches are printed from ranging white to black with any standard or conventional error diffusion process. Thereafter, the reflectance of each test patch is measured. Since the input grey level $G_{in}$ for each printed test patch is known, one can plot the output grey level $G_{out}$ (the measured reflectance) of the test patches versus the known input grey level value $G_{in}$. In this regard, the plot generates a curve similar to that illustrated in FIG. 1. Since when utilizing a standard or conventional error diffusion process the measure output grey level $G_{out}$ will exceed that of the input grey level $G_{in}$, the statistical effective area of a printed black spot can be calculated by $A=G_{out}/G_{in}$ and represented by $A(G)$. Thus, the effective spot area $A(G)$ can be tabulated as a function of $G_{out}$.

This new effective spot area $A(G)$ is then utilized in determining the error to be propagated to downstream neighboring pixels in the error diffusion process. More specifically, when a binary printing device prints a black pixel and the error diffusion modified input grey level is $G'_{in}$, the error to be propagated to the downstream neighboring pixels is $G'_{in}-A(G)$. On the other hand, when a binary printing device prints a white pixel and the error diffusion modified input grey level is $G'_{in}$, the error to be propagated to the downstream neighboring pixels is $G'_{in}$.

FIG. 2 illustrates a circuit which implements such a compensated error diffusion process. In FIG. 2, an input grey value $G_{in}$ is received by an adder 107. The adder 107 also receives the accumulated error generated from neighboring pixels which has been propagated to the pixel location associated with the input grey value $G_{in}$. These two values are added by the adder 107 to produce a error diffusion modified input grey value $G'_{in}$.

The modified grey value $G'_{in}$ is received by a comparator 109, a multiplexer 105, and a subtraction circuit 103. In the preferred embodiment of the present invention, the grey level or video range of the image data is 0 to 255. In the comparator 109, the modified grey value $G'_{in}$ is compared with a threshold value to determine whether a pixel is to be printed or not. In the preferred embodiment of the present invention, the threshold value is 128; however, any threshold value or threshold process can be utilized. For example, the threshold process disclosed in co-pending U.S. patent application, having Attorney Docket Number D/93532 and filed concurrently herewith, can be utilized. The entire contents of this U.S. patent application (Attorney Docket Number D/93532) are hereby incorporated by reference.

The output from the comparator 109 represents whether a printer will print a pixel or not and is fed into the multiplexer 105 as well as to the printing device for proper rendering. The input grey value $G_{in}$ is also received by a look-up table 101 which stores the empirically deduced effective spot area $A(G)$ values for that particular printing device. The values are pre-tabulated through the printing of test patches and the measuring of the reflectance of these test patches. Based on the input grey value $G_{in}$, the look-up table 101 outputs the associated effective spot value $A(G)$. This effective spot area value $A(G)$ is fed to the subtraction circuit 103 wherein the subtraction circuit 103 subtracts the effective spot area value $A(G)$ from the modified grey value $G'_{in}$. The result of the subtraction circuit 103 is fed to the multiplexer 105.

The multiplexer 105 selects either the value $G'_{in}$ or the value $G'_{in}-A(G)$ based on the output received from comparator 109. More specifically, if the output will cause a black pixel is to be printed; i.e., $G'_{in}$ is greater than the threshold value; the multiplexer selects the input value of $G'_{in}-A(G)$. On the other hand, if the comparator 109 determines that a white pixel is to be generated; i.e., the value $G'_{in}$ is less than the threshold value; the multiplexer selects the value $G'_{in}$ to output.

The output value from the multiplexer 105 reflects the error value, Err, to be propagated to downstream pixels. This error value, Err, is fed into an error generation circuit 111 which produces the actual error values to be propagated to the individual downstream pixels. This error generation circuit 111 may be a multiplier which multiplies the error value, Err, from the multiplexer 105 by various error fraction values or error coefficients. The error fraction values or error coefficients may be any conventional set of error diffusion; i.e., the error coefficients described in U.S. Pat. No. 5,353,127. The entire contents of U.S. Pat. No. 5,353,127 are hereby incorporated by reference. On the other hand, the error generation circuit 111 may be a look-up table which has prestored therein the individual error values to be propagated to the downstream pixels wherein the error values are retrieved from the look-up table based on the error value input value and inputted coefficient values used for the particular error diffusion process.

The individual fractional error values are temporarily stored in an error buffer 113 for proper recall when the pixel associated with the buffered error value is to be processed in the error diffusion process.

One application of the present invention is in a binary printer. In this situation, the error diffusion process converts a multi-level input grey image signal to a binary signal which is used to record the input image on a recording medium. The recording medium may be any vehicle upon which an image or latent image of the original input image can be formed.

Another application of the present invention is in a digital copier. In this situation, the error diffusion process converts a multi-level input grey image signal generated by a digital scanner scanning a document or any other vehicle having an image formed thereon to a binary signal which is used to record the input image on a recording medium. Again, the recording medium may be any vehicle upon which an image or latent image of the original input image can be formed.

The present invention has been described in detail above; however, various modifications can be implemented without departing from the spirit of the present invention. For example, the preferred embodiment of the present invention has been described with respect to a printing system; however, this error diffusion compensation method is readily implemented in a display system. Moreover, the error diffusion compensation method of the present invention can be readily implemented on an ASIC, thereby enabling the placement of this process in a scanner, electronic subsystem, printer, or display device.

Moreover, the present invention has been described with respect to a video range of 0 to 255. However, it is contemplated by the present invention that the video range can be any suitable range to describe the grey level of the pixel being processed. Furthermore, the present invention is readily applicable to any rendering system, not necessarily a binary output device. It is contemplated that the concepts of the present invention are readily applicable to a four-level image output terminal or higher.

Lastly, the present invention has been described with respect to a monochrome or black/white environment. However, the concepts of the present invention are readily applicable to a color environment. Namely, the error diffusion compensation process of the present invention can be applied to each color space value representing the color pixel.

In recapitulation, the present invention provides an error diffusion method or module which enables an image processing system to convert an electronic document of one format to that of another format utilizing a spot overlap compensation value that eliminates clumps and streaks of dark pixels in the midtone to shadow areas of the image while enabling the rendering of a reproduced grey wedge that demonstrates a gradual increase in density when compared to an original grey wedge.

While the present invention has been described with reference to various embodiments disclosed herein before, it is not to be combined to the detail set forth above, but is intended to cover such modifications or changes as made within the scope of the attached claims.

What is claimed is:

1. A system for processing an input grey image value corresponding to a pixel, comprising:

modifying means for adding an error value to the input grey image value to produce a modified input grey image value;

comparing means for comparing the modified input grey image value with a predetermined threshold value and for outputting a rendering value based on the comparison;

error means, operatively connected to said comparing means, for generating an error equal to the modified input grey value when the modified input grey value is less than the predetermined threshold value and for generating an error equal to the modified input grey value minus an effective spot area value when the modified input grey value is equal to or greater than the predetermined threshold value;

diffusing means for fractionalizing the error into fractional error values and diffusing the fractional error values to pixels adjacent the pixel; and buffer means, operatively connected to said diffusing means and said modifying means, for accumulating the diffused fractional error values for individual pixels and generating the error value therefrom.

2. The system as claimed in claim 1, wherein said error means comprises:

effective spot area value generating means for generating the effective spot area value based on the input grey image value;

subtraction means for subtracting the effective spot area value from the modified input grey image value to produce a difference; and multiplexing means, operatively connected to said modifying means, said comparing means, and said subtraction means, for selecting the difference when the modified input grey value is equal to or greater than the predetermined threshold value and selecting modified input grey image value when the modified input grey value is less than the predetermined threshold value.

3. The system as claimed in claim 2, wherein said effective spot area value generating means includes a look-up table having a plurality of effective spot area values, each effective spot area value being mapped to an input grey image value.

4. The system as claimed in claim 1, further comprising a printer operatively connected to said comparing means.

5. The system as claimed in claim 4 wherein the effective spot area value is equal to an output grey image value divided by the input grey image value, the output grey image value being a value corresponding to the input grey image value from a tonal reproduction curve representing printing characteristics of said printer.

6. A digital copier, comprising:

scanning means for scanning a document and generating input grey image values corresponding to a plurality of pixels;

modifying means for adding an error value to an input grey image value corresponding to a first pixel to produce a modified input grey image value;

comparing means for comparing the modified input grey image value with a predetermined threshold value and for outputting a rendering value based on the comparison;

error means, operatively connected to said comparing means for generating an error equal to the modified input grey value when the modified input grey value is less than the predetermined threshold value and for generating an error equal to the modified input grey value minus an effective spot area value when the modified input grey value is equal to or greater than the predetermined threshold value;

diffusing means for fractionalizing the error into fractional error values and diffusing the fractional error values to pixels adjacent the first pixel;

buffer means, operatively connected to said diffusing means and said modifying means, for accumulating the diffused fractional error values for individual pixels and generating the error value therefrom; and print means, operatively connected to said comparing means, for reproducing an image on a recording medium based on the output from said comparing means.

7. The system as claimed in claim 6, wherein said error means comprises:

effective spot area value generating means for generating the effective spot area value based on the input grey image value;

subtraction means for subtracting the effective spot area value from the modified input grey image value to produce a difference; and multiplexing means, operatively connected to said modifying means, said comparing means, and said subtraction means, for selecting the difference as the error when the modified input grey value is equal to or greater than the predetermined threshold value and selecting modified input grey image value as the error when the modified input grey value is less than the predetermined threshold value.

8. The system as claimed in claim 7, wherein said effective spot area value generating means includes a look-up table having a plurality of effective spot area values, each effective spot area value being mapped to an input grey image value.

9. The system as claimed in claim 6, wherein the effective spot area value is equal to an output grey image value divided by the input grey image value, the output grey image value being a value corresponding to the input grey image value from a tonal reproduction curve representing printing characteristics of said printer.

10. A method of processing an input grey image value corresponding to a pixel, comprising the steps of:

(a) adding an error value to the input grey image value to produce a modified input grey image value;

(b) comparing the modified input grey image value with a predetermined threshold value and outputting a rendering value based on the comparison;

(c) generating an error equal to the modified input grey value when the modified input grey value is less than the predetermined threshold value;

(d) generating an error equal to the modified input grey value minus an effective spot area value when the modified input grey value is equal to or greater than the predetermined threshold value;

(e) fractionalizing the error into fractional error values;

(f) diffusing the fractional error values to pixels adjacent the pixel; and (g) accumulating the diffused fractional error values for individual pixels and generating the error value therefrom.

11. The method as claimed in claim 10, further comprising the step of:

(h) generating the effective spot area value based on the input grey image value.

12. The method as claimed in claim 11, wherein said step (h) generates the effective spot area value from a look-up table having a plurality of effective spot area values, each effective spot area value being mapped to an input grey image value.

13. The method as claimed in claim 10, further comprising the step of:

(h) reproducing an image on a recording medium based the output from said step (b).

14. The system as claimed in claim 13, wherein the effective spot area value is equal to an output grey image value divided by the input grey image value, the output grey image value being a value corresponding to the input grey image value from a tonal reproduction curve representing printing characteristics.

15. A method of generating an effective spot area value to be used in an error diffusion process, comprising the steps of:

(a) scanning a set of grey test patches corresponding to a set of known grey input values and generating image data therefrom;

(b) printing a set of grey patches based on the generated image data;

(c) measuring a reflectance of each grey test patch to generate a plurality of output grey values, one output grey value for each test patch and corresponding known grey input value;

(d) generating a tonal reproduction curve from the set of known grey input values and corresponding output grey values; and (e) calculating a plurality of effective spot area values, each effective spot area value being a result of dividing one output grey value by the corresponding known grey input value.

16. A system for processing an input grey image value corresponding to a pixel, comprising:

modifying means for adding an error value to the input grey image value to produce a modified input grey image value;

comparing means for comparing the modified input grey image value with a predetermined threshold value and for outputting a rendering value based on the comparison;

effective spot area value means for outputting one of a plurality of effective spot area values according to the input grey image value, the effective spot area values being created from a process of scanning a set of grey test patches corresponding to a set of known grey input values and generating image data therefrom, printing a set of grey patches based on the generated image data, measuring a reflectance of each grey test patch to generate a plurality of output grey values, one output grey value for each test patch and corresponding known grey input value, generating a tonal reproduction curve from the set of known grey input values and corresponding output grey values, calculating a plurality of effective spot area values, each effective spot area value being a result of dividing one output grey value by the corresponding known grey input value, and storing the plurality of effective spot area values as a function of the output grey value;

error means, operatively connected to said comparing means and said effective spot area value means, for generating an error equal to the modified input grey value when the modified input grey value is less than the predetermined threshold value and for generating an error equal to the modified input grey value minus the effective spot area value when the modified input grey value is equal to or greater than the predetermined threshold value;

diffusing means for fractionalizing the error into fractional error values and diffusing the fractional error values to pixels adjacent the pixel; and buffer means, operatively connected to said diffusing means and said modifying means, for accumulating the diffused fractional error values for individual pixels and generating the error value therefrom.

* * * * *